United States Patent
Zhang et al.

(10) Patent No.: US 10,514,937 B2
(45) Date of Patent: Dec. 24, 2019

(54) AUTO-DISCOVERY SERVICE AND METHOD OF DISCOVERING APPLICATIONS WITHIN A VIRTUAL NETWORK

(75) Inventors: Yiwen Zhang, Beijing (CN); Liang Cui, Beijing (CN); Zhifeng Xia, Beijing (CN)

(73) Assignee: VMware, Inc., Palo Alto, CA (US)

( * ) Notice: Subject to any disclaimer, the term of this patent is extended or adjusted under 35 U.S.C. 154(b) by 507 days.

(21) Appl. No.: 13/344,505

(22) Filed: Jan. 5, 2012

(65) Prior Publication Data

US 2013/0179879 A1 Jul. 11, 2013

(51) Int. Cl.
G06F 9/455 (2018.01)

(52) U.S. Cl.
CPC ...... G06F 9/45533 (2013.01); G06F 9/45537 (2013.01); G06F 9/45545 (2013.01)

(58) Field of Classification Search
CPC ............. G06F 9/45533; G06F 9/45537; G06F 9/45545; H04L 29/08072
USPC .......................................... 717/120; 709/224
See application file for complete search history.

(56) References Cited

U.S. PATENT DOCUMENTS

| | | | | |
|---|---|---|---|---|
| 6,101,528 A * | 8/2000 | Butt | | 709/203 |
| 6,836,462 B1 * | 12/2004 | Albert | | H04L 29/06 370/235 |
| 6,868,450 B1 * | 3/2005 | Lucovsky | | G06F 9/46 709/225 |
| 7,346,909 B1 * | 3/2008 | Eldar et al. | | 719/312 |
| 7,921,282 B1 * | 4/2011 | Mukerji et al. | | 713/151 |
| 8,380,882 B2 * | 2/2013 | Pope | | H04L 49/90 709/250 |
| 8,416,695 B2 * | 4/2013 | Liu et al. | | 370/241 |
| 2002/0143955 A1 * | 10/2002 | Shimada | | H04L 29/06 709/227 |
| 2004/0177158 A1 * | 9/2004 | Bauch et al. | | 709/245 |
| 2005/0114855 A1 * | 5/2005 | Baumberger | | 718/1 |
| 2005/0165917 A1 * | 7/2005 | Le | | H04L 63/0236 709/220 |
| 2005/0254492 A1 * | 11/2005 | Denneau et al. | | 370/389 |

(Continued)

OTHER PUBLICATIONS

Unknown Author, "The TCP/IP Guide"—TCP/IP Application Assignments and Server Port Number Ranges: Well-Known, Registered and Dynamic/Private Ports, www.tcpipguide.com/free/t_TCPIPApplicationAssignmentsandServerPortNumberRang-2.htm, Aug. 2004.*

(Continued)

*Primary Examiner* — Francisco J Aponte
*Assistant Examiner* — Kevin X Lu

(57) ABSTRACT

Embodiments provide a system including a first host computing device that includes a first virtual machine (VM) and a first application. The system also includes a second host computing device including a virtualization software layer, a second VM, and an auto-discovery service at least partially instantiated within the virtualization software layer. The auto-discovery service is configured to receive a message and an auto-discovery packet from a second application executing on the second VM. The auto-discovery service inserts an option into the auto-discovery packet, and transmits the auto-discovery packet to the first application. The option in the auto-discovery packet includes the message received from the second application.

19 Claims, 5 Drawing Sheets

(56) References Cited

U.S. PATENT DOCUMENTS

| | | | |
|---|---|---|---|
| 2007/0288921 A1* | 12/2007 | King et al. | 718/1 |
| 2008/0080508 A1* | 4/2008 | Das et al. | 370/392 |
| 2010/0087212 A1* | 4/2010 | Shi | H04W 4/12 455/466 |
| 2011/0022812 A1* | 1/2011 | van der Linden et al. | 711/163 |
| 2011/0299537 A1* | 12/2011 | Saraiya | H04L 61/2596 370/392 |
| 2012/0287931 A1* | 11/2012 | Kidambi et al. | 370/392 |
| 2013/0139182 A1* | 5/2013 | Sethuraman et al. | 719/320 |
| 2013/0159999 A1* | 6/2013 | Chiueh et al. | 718/1 |

OTHER PUBLICATIONS

Riverbed Certified Solutions Professional (RCSP) Study Guide, Version 1.0.13 (Apr. 2008).

Auto-Discovery of WAN Optimization Appliances and Connections (http://blog.exinda.com/bid/57544/Auto-Discovery-of-WAN-Optimization-Appliances-and-Connections) (Feb. 28, 2011) (accessed Jul. 5, 2011).

* cited by examiner

AUTO-DISCOVERY SERVICE AND METHOD OF DISCOVERING APPLICATIONS WITHIN A VIRTUAL NETWORK

BACKGROUND

Software applications, such as virtual machines (VMs), may be executed by a group, or "cluster," of host computing devices. Each VM creates an abstraction of physical computing resources, such as a processor and memory, of the host executing the VM and executes a "guest" operating system, which, in turn, executes one or more software applications. The abstracted resources may be functionally indistinguishable from the underlying physical resources to the guest operating system and software applications.

At least some host computing devices are connected together to form one or more networks. In addition, some network architectures include a large number of computing devices connected together to form complex network topologies. Such network architectures increase a cost and/or a complexity of managing networks built on the network architectures. Due to the complexity and size of such network architectures, the network architectures may change, experience instabilities, and/or become misconfigured. The complexity of the network architectures also increases an amount of effort required to identify computing devices, applications, and resources within a network. To properly configure such networks for use in cloud computing and/or datacenter environments, significant amounts of time and money are often expended.

For example, applications executing within the computing devices of the network may spend significant amounts of time discovering the existence and/or addresses of other applications within the network. The applications may cause additional traffic to be transmitted through the network to discover information about other applications, which may decrease an efficiency of the network. The decrease in efficiency and the increased amount of time spent discovering other applications may reduce an amount of revenue generated by the computing devices within the network.

SUMMARY

One or more embodiments described herein provide an auto-discovery (AD) service that enables a local application to discover a corresponding remote application. The local application registers a callback function, a message, and a plurality of traffic interception rules with the AD service. The AD service also receives an AD network packet from the local application to be sent to a remote device to discover whether a corresponding remote application exists within the remote device. The AD service determines whether the information in the header of the AD packet satisfies the traffic interception rules. If the traffic interception rules are satisfied, the AD service inserts the message as an option within the AD packet header. The AD packet is transmitted to the remote device, and a remote application executing on the remote device inserts a second message within a second packet. The remote application transmits the second packet to the local application. The AD service intercepts the second packet and determines whether the information in the second packet header satisfies the traffic interception rules. If the traffic interception rules are satisfied, the AD service extracts the second message from the second packet. The AD service also transmits the second message to the first application using the callback function.

This summary introduces a selection of concepts that are described in more detail below. This summary is not intended to identify essential features, nor to limit in any way the scope of the claimed subject matter.

DETAILED DESCRIPTION

Embodiments described herein provide an auto-discovery (AD) service that enables a local application to discover a corresponding remote application. The local application registers a callback function, a message, and a plurality of traffic interception rules with the AD service. In an embodiment, the message includes the internet protocol (IP) address of the local application. The AD service also receives an AD packet from the local application to be sent to a remote device to discover whether a corresponding remote application exists within the remote device. The AD service intercepts the AD packet and determines whether the information in the header of the AD packet satisfies the traffic interception rules. If the traffic interception rules are satisfied, the AD service inserts the message as an option within the AD packet header. The AD packet is transmitted to the remote device, and a remote application executing on the remote device inserts a second message within a second packet. In an embodiment, the second message includes the IP address of the second application. The remote application then transmits the second packet to the local application. The AD service intercepts the second packet and determines whether the information in the second packet header satisfies the traffic interception rules. If the traffic interception rules are satisfied, the AD service extracts the second message from the second packet. The AD service also transmits the second message to the first application using the callback function.

Accordingly, the AD service enables a local application to discover the existence of one or more remote applications executing on one or more remote devices. In addition, the AD service enables the local application to discover the network address of the remote applications. The AD service uses data inserted into transport control protocol (TCP) headers to discover the information from the remote applications. Accordingly, no additional overhead is added to network traffic transmitted and received by the local application and the remote application. Because the AD service uses TCP-based messaging, the AD service and messages transmitted by the AD service are transparent to network address translation (NAT) and firewall services or devices. Additionally, the AD service is executed within a virtualization software layer of a host computing device and is at least partially executed at a kernel layer of the virtualization software layer. As a result, the AD service may be executed quickly with low application overhead to create a fast, efficient network discovery service.

Figure 1:
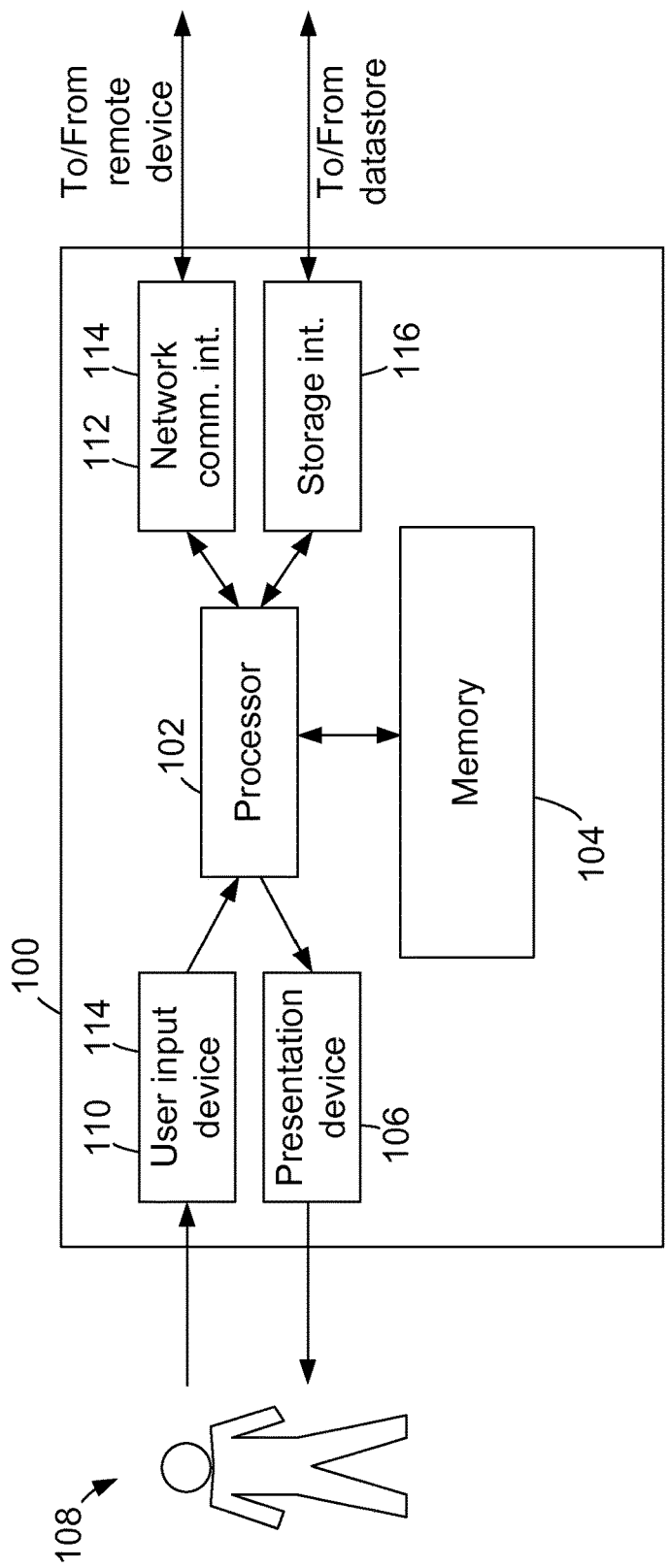
FIG. 1 is a block diagram of an exemplary computing device.

FIG. 1 is a block diagram of an exemplary computing device 100. Computing device 100 includes a processor 102 for executing instructions. In some embodiments, computer-executable instructions are stored in a memory 104 for performing one or more of the operations described herein. Memory 104 is any device allowing information, such as executable instructions, configuration options (e.g., threshold values), and/or other data, to be stored and retrieved. For example, memory 104 may include one or more computer-readable storage media, such as one or more random access memory (RAM) modules, flash memory modules, hard disks, solid state disks, and/or optical disks.

Computing device 100 also includes at least one presentation device 106 for presenting information to a user 108. Presentation device 106 is any component capable of conveying information to user 108. Presentation device 106 may include, without limitation, a display device (e.g., a liquid crystal display (LCD), organic light emitting diode (OLED) display, or "electronic ink" display) and/or an audio output device (e.g., a speaker or headphones). In some embodiments, presentation device 106 includes an output adapter, such as a video adapter and/or an audio adapter. An output adapter is operatively coupled to processor 102 and configured to be operatively coupled to an output device, such as a display device or an audio output device.

The computing device 100 may include a user input device 110 for receiving input from user 108. User input device 110 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of presentation device 106 and user input device 110.

Computing device 100 also includes a network communication interface 112, which enables computing device 100 to communicate with a remote device (e.g., another computing device 100) via a communication medium, such as a wired or wireless packet network. For example, computing device 100 may transmit and/or receive data via network communication interface 112. User input device 110 and/or network communication interface 112 may be referred to as an input interface 114 and may be configured to receive information, such as configuration options (e.g., threshold values), from a user.

Computing device 100 further includes a storage interface 116 that enables computing device 100 to communicate with one or more datastores. In exemplary embodiments, storage interface 116 couples computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
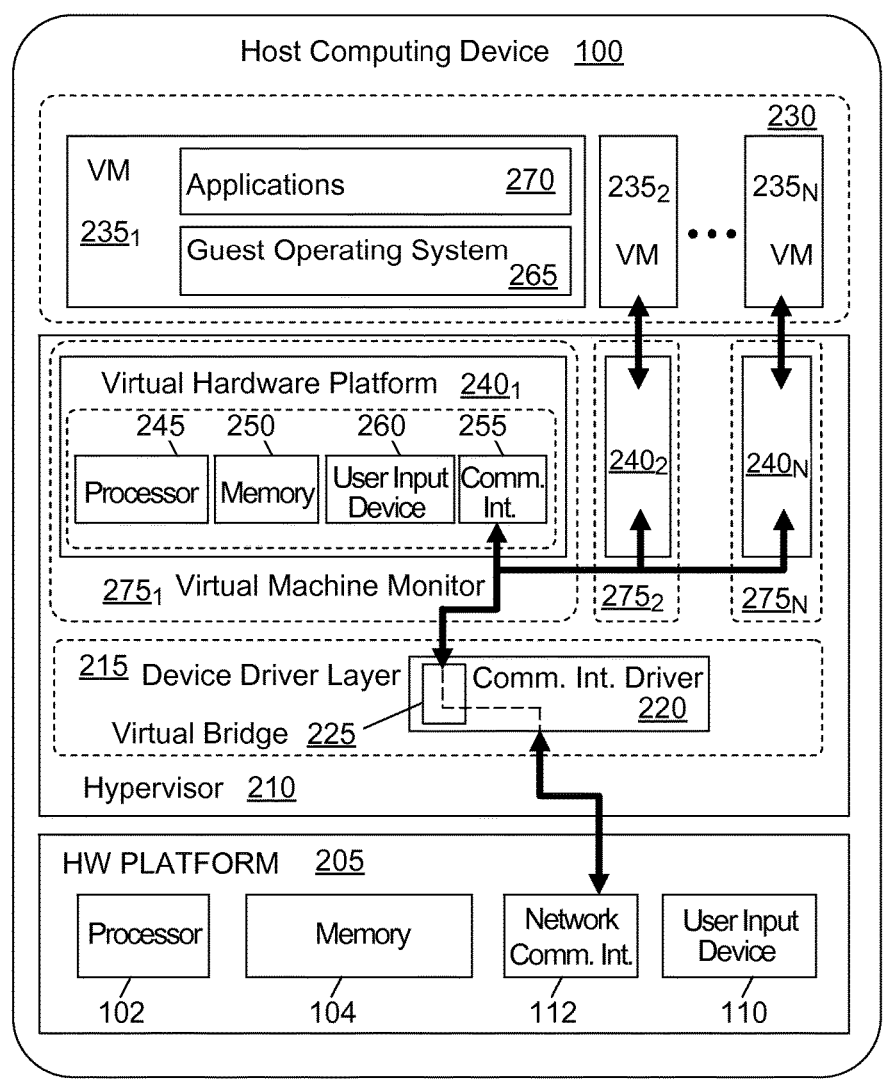
FIG. 2 is a block diagram of virtual machines that are instantiated on a computing device, such as the computing device shown in FIG. 1.

FIG. 2 depicts a block diagram of virtual machines $235_1$, $235_2$ ... $235_N$ that are instantiated on a computing device 100, which may be referred to as a "host." Computing device 100 includes a hardware platform 205, such as an x86 architecture platform. Hardware platform 205 may include processor 102, memory 104, network communication interface 112, user input device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user input device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$). Each virtual hardware platform includes its own emulated hardware (such as a processor 245, a memory 250, a network communication interface 255, a user input device 260 and other emulated I/O devices in VM $235_1$).

In some embodiments, memory 250 in first virtual hardware platform $240_1$ includes a virtual disk that is associated with or "mapped to" one or more virtual disk images stored in memory 104 (e.g., a hard disk or solid state disk) of computing device 100. The virtual disk image represents a file system (e.g., a hierarchy of directories and files) used by first virtual machine $235_1$ in a single file or in a plurality of files, each of which includes a portion of the file system. In addition, or alternatively, virtual disk images may be stored in memory 104 of one or more remote computing devices 100, such as in a storage area network (SAN) configuration. In such embodiments, any quantity of virtual disk images may be stored by the remote computing devices 100.

Device driver layer 215 includes, for example, a communication interface driver 220 that interacts with network communication interface 112 to receive and transmit data from, for example, a local area network (LAN) connected to computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface may be assigned a unique virtual Media Access Control (MAC) address that enables virtual bridge 225 to simulate the forwarding of incoming data packets from network communication interface 112. In an embodiment, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Virtual hardware platforms $240_1$-$240_N$ may be considered to be part of virtual machine monitors (VMM) $275_1$-$275_N$ which implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an embodiment of the disclosure is included as a component in VMware's ESX brand software, which is commercially available from VMware, Inc.

Figure 3:
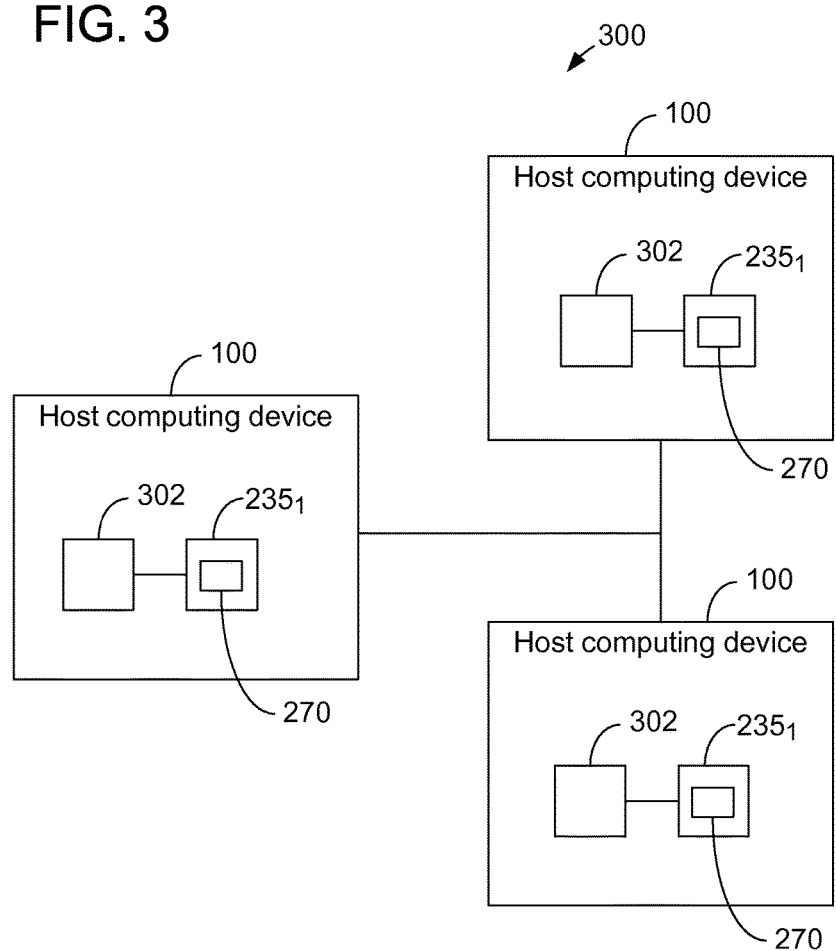
FIG. 3 is a block diagram of an exemplary network including a plurality of computing devices, such as a plurality of computing devices shown in FIG. 1.
Figure 4:
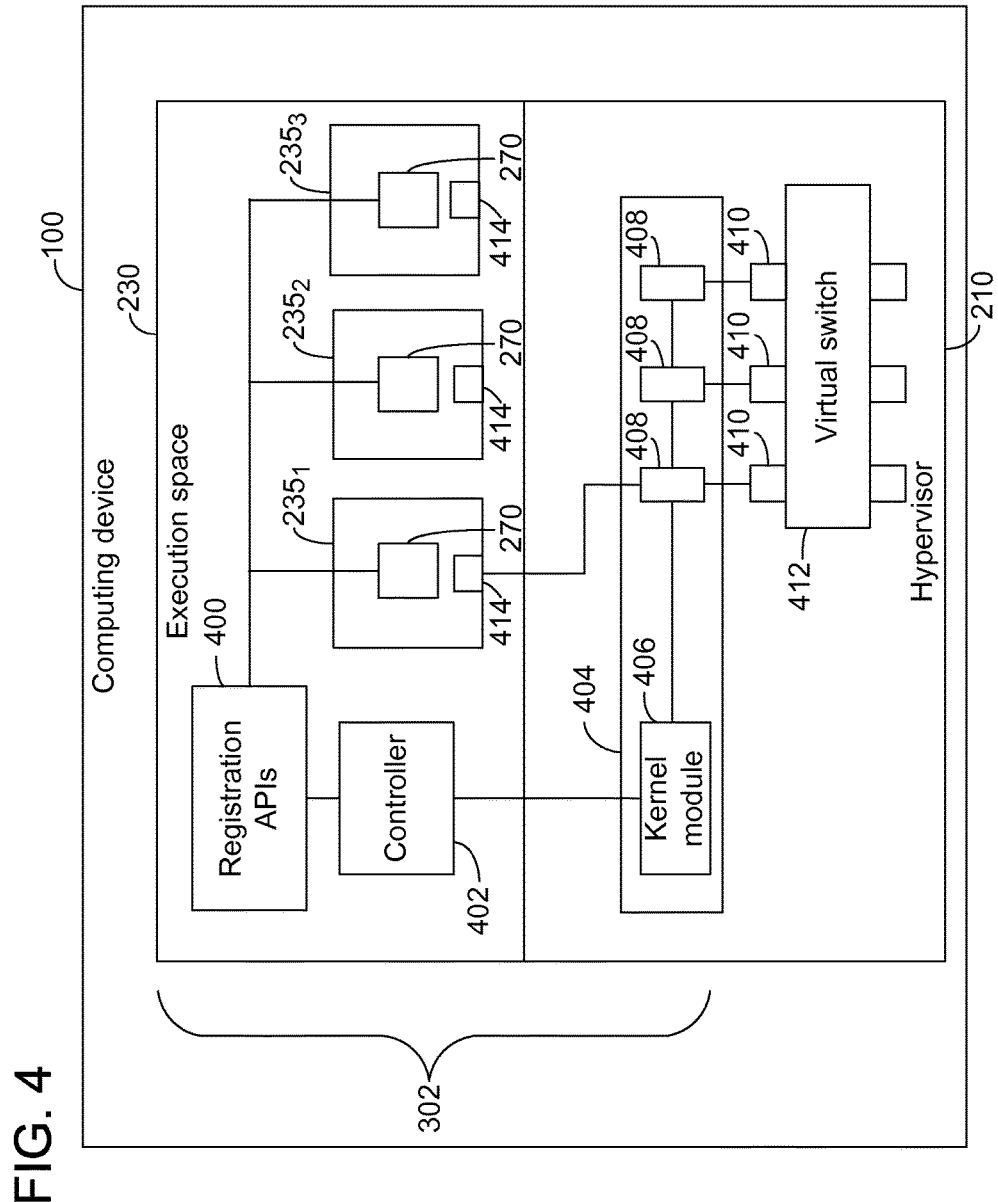
FIG. 4 is a block diagram of an exemplary auto-discovery service shown in FIG. 3.

FIG. 3 is a block diagram of an exemplary network 300 that includes a plurality of host computing devices 100 communicatively coupled together. FIG. 4 is a block diagram of an exemplary auto-discovery (AD) service 302 at least partially executing or instantiated within a hypervisor 210, or virtualization software layer, of each computing device 100. In an embodiment, each computing device 100 (and one or more applications or services executing therein) uses AD service 302 to discover information relating to one or more applications or services (hereinafter referred to as a "remote application") executing within other computing devices 100 within network 300. Accordingly, AD service 302 is communicatively coupled to, and may be used with, a plurality of VMs $235_1$-$235_N$ and/or applications 270. The discovered information may include an existence of the remote application, a network address of the remote application, and/or any other information that enables network 300 to function as described herein. In some embodiments, local application 270 and one or more remote applications are executing within different VMs $235_1$-$235_N$ of the same computing device 100.

In an embodiment, AD service 302 is instantiated within hypervisor 210 and virtual machine execution space 230 of computing device 100. More specifically, AD service 302 includes a set of registration application programming interfaces (APIs) 400, a controller module 402, and an interceptor application 404 including an interceptor kernel module 406 and a plurality of traffic interceptor modules 408. Registration APIs 400 and controller module 402 are instantiated within execution space 230, and interceptor application 404 is instantiated within hypervisor 210. Alternatively, registration APIs 400, controller module 402, and/or interceptor application 404 may be instantiated within any other software or hardware component or system of computing device 100.

Registration APIs 400 define one or more sets of data structures and/or functions that are exposed to, and called by, one or more local applications 270 (i.e., one or more applications 270 local to the host computing device 100 implementing AD service 302). The registration APIs 400 are used by a local application 270 to register or record a callback function and/or other information regarding the local application 270, and to configure the AD service 302. In some embodiments, the callback function includes a textual notification format or framework and an open TCP/UDP (user datagram protocol) port. When AD service 302 discovers the IP address (or other information) from a remote application, AD service 302 notifies the local application 270 by inserting the message data into the textual notification framework and transmitting the data to the local application 270 through the open port. As used herein, the term "register" refers to associating and/or recording data (or an application) with an application or device. For example, registering may include linking the data to the application, inserting at least a portion of the data into the application (e.g., filling out one or more fields or table entries within the application), and/or any other association between the data and the application.

In an embodiment, local application 270 uses registration APIs 400 to identify and register traffic interception rules that are used by traffic interceptor modules 408. Registration APIs 400 transmit the traffic interception rules to controller module 402, which in turn transmits the rules to traffic interceptor modules 408 through interceptor kernel module 406. The local application 270 also uses registration APIs 400 to register an application-specific message to be transmitted to remote applications. In an embodiment, the message is encoded by the local application 270 in an application-specific manner and includes the internet protocol (IP) address of the local application 270 and/or other identifying information of the local application 270. Alternatively or additionally, the message may include any other information identified and/or selected by the local application 270, such as a media access control (MAC) address of the local application 270. In an embodiment, registration APIs 400 encode the message as a transmission control protocol (TCP) option. More specifically, in an embodiment, the TCP option has a predetermined type of 0x14, and the message contents are included in the TCP option field. Alternatively, the TCP option type may be any other option type that is unassigned or unused by the TCP protocol, and/or may be updated or changed by an administrator or another user.

Controller module 402 is an application embodied and executed within execution space 230 of hypervisor 210 at an application or user layer. Controller module 402 operates as an intermediate software interface or bridge that transmits data between registration APIs 400 and interceptor application 404. In an embodiment, controller module 402 receives requests to register callback functions and/or traffic interception rules (hereinafter referred to as "registration requests") from local applications 270 (through registration APIs 400) and transmits discovery requests to remote applications. In addition, controller module 402 receives and/or changes a kernel module state of interceptor application 404, for example, using one or more software tools or applications provided by a virtual storage integrator (VSI) framework or using a system call, such as input/output control (ioctl) in a hypervisor 210 based on a UNIX brand operating system.

Interceptor application 404 is an application embodied and executed within a kernel layer of hypervisor 210. Interceptor application 404 is used to monitor and/or analyze network traffic received by, and transmitted from, hypervisor 210. More specifically, interceptor application 404 includes interceptor kernel module 406 and traffic interceptor modules 408. In an embodiment, interceptor kernel module 406 instantiates the traffic interceptor modules 408 within hypervisor 210 during an initialization phase of AD service 302. Each traffic interceptor module 408 is attached to a port 410 of a virtual switch 412 positioned within hypervisor 210. In some embodiments, traffic interceptor modules 408 are kernel modules of an ESX brand host that is available from VMware, Inc. In one embodiment, virtual switch 412 is embodied within virtual bridge 225 (shown in FIG. 2). Each traffic interceptor module 408 is also attached to a virtual network interface card (NIC) 414 of a VM $235_1$-$235_N$ such that traffic interceptor module 408 is attached between a virtual NIC 414 and a port 410 associated with virtual NIC 414 and VM $235_1$-$235_N$. Alternatively, traffic interceptor modules 408 may be attached to an NIC (not shown) of computing device 100 and/or a virtual NIC (not shown) of a hypervisor 210. Accordingly, each inbound network packet received by virtual switch 412 is "intercepted" (i.e., received and analyzed) by a traffic interceptor module 408 before the packet is received by virtual NIC 414 and VM $235_1$. In addition, each network packet transmitted from a VM $235_1$-$235_N$ through a virtual NIC 414 is received and analyzed by an associated traffic interceptor module 408 before the packet is transmitted from virtual switch 412.

In an embodiment, interceptor application 404 maintains a database, such as a global rule descriptor, that stores information related to network connections to and from local application 270 (i.e., to and from the VM $235_1$ executing local application 270). For example, the interceptor application 404 stores, in the database, a list of open or available network connections from each local application 270 to one or more remote applications. In an embodiment, the database is stored in a memory, such as memory 250 or 104, and includes a list of fields or filter conditions, such as source IP address, a destination IP address, and a destination port, to be used with the traffic interception rules. For example, only network traffic that matches the fields stored in the database is acted upon by interceptor application 404. In other words, interceptor application 404 filters the network traffic using the traffic interception rules, and the network traffic that matches the data stored in the database fields is acted upon by interceptor application 404. In some embodiments, one or more of the fields may include a zero or another indicator that the field is unused for traffic filtering (i.e., network traffic with any value for the unused field is acted upon by interceptor application 404). Alternatively or additionally, the fields may include any other data that enables network 300 to function as described herein.

Figure 5:
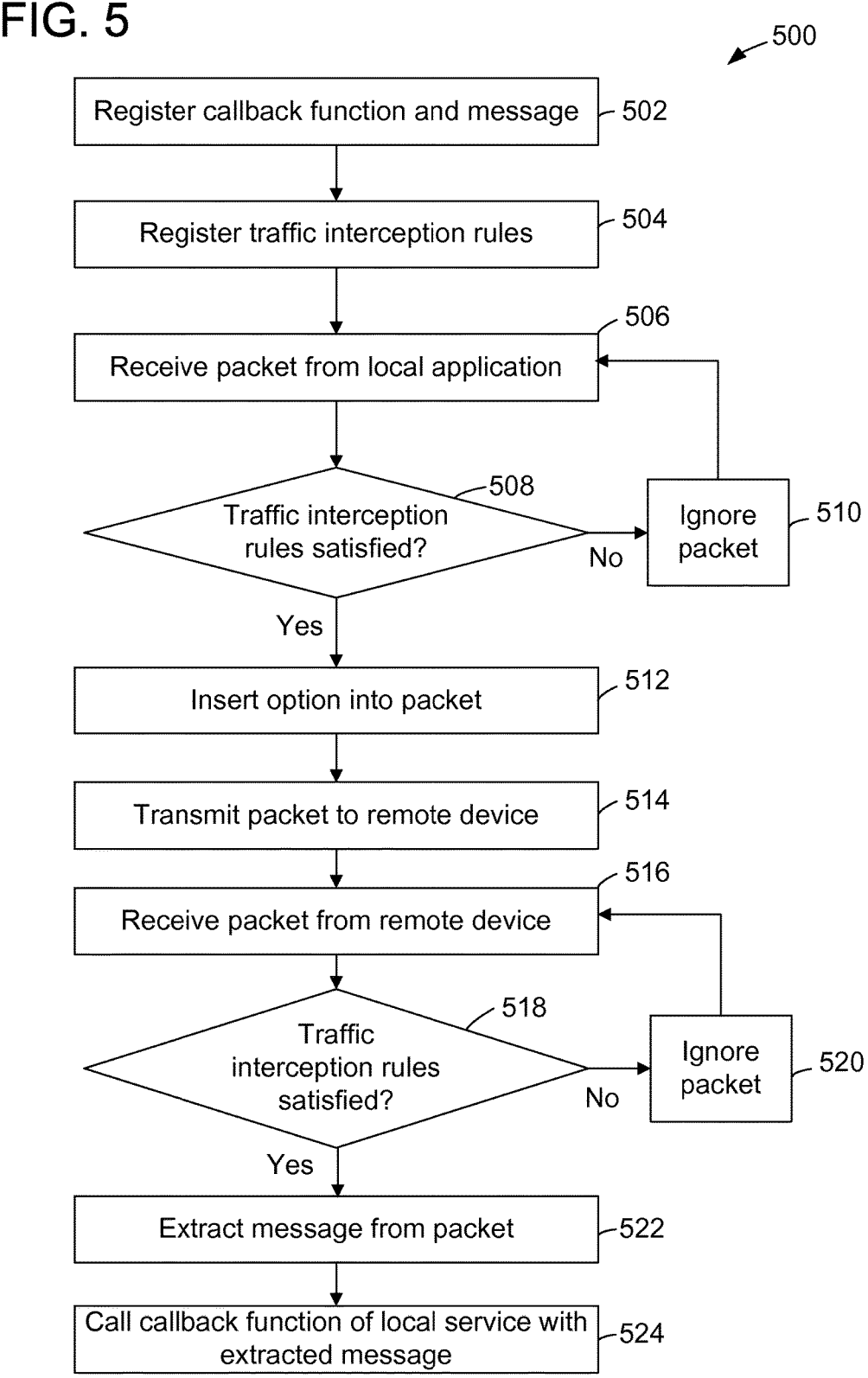
FIG. 5 is a flowchart of an exemplary method for discovering applications within a network, such as the network shown in FIG. 3.

FIG. 5 is a flowchart of an exemplary method 500 for discovering applications in a network, such as network 300 (shown in FIG. 3). More specifically, method 500 discovers remote applications executing within remote devices, such as remote computing devices 100 (shown in FIG. 1), and/or within remote VMs, such as VMs $235_1$-$235_N$ (shown in FIG. 2). Method 500 is executed by a computing device 100 (shown in FIG. 1). For example, a plurality of computer-executable instructions are embodied within a computer-readable medium, such as memory 104 or memory 250. The instructions, when executed by a processor, such as processor 102 or processor 245, cause the processor to execute the steps of method 500 and/or to function as described herein.

In an embodiment, a local application 270 (and the computing device 100 hosting the local application 270) executes AD service 302 and calls registration APIs 400 to discover corresponding remote applications executing in one or more remote VMs $235_1$-$235_N$. The remote applications (and the computing devices 100 hosting the remote applications) corresponding to the local application 270 also execute an AD service 302 that functions as described herein. The local application 270 calls registration APIs 400 or provides AD service 302 with a callback function, a message, and a plurality of traffic configuration rules. The callback function is a function of the local application 270 that is used to pass information received from a remote application to the local application 270. The message is an IP address of the local application 270 and/or any other message. The traffic interception rules include filtering or matching data contained in a header of each received network packet with the values of the database fields. In an embodiment, the traffic interception rules include determining whether a TCP SYN bit is set within the packet header of any outbound network packet (e.g., any packet originating from local application 270) received by traffic interceptor modules 408. In addition, the traffic interception rules may include determining whether a source IP address, a destination IP address, and/or a destination port number are equal to or within IP address and/or port number values and/or ranges identified in the database fields.

After receiving the callback function, the message, and the traffic configuration rules, AD service 302 registers 502 the callback function and the message, and registers 504 the traffic configuration rules. In an embodiment, the callback function, the message, and the traffic configuration rules are registered or associated with one or more traffic interceptor modules 408. After the callback function and the message have been registered 502, and the traffic interception rules have been registered 504, the local application 270 is considered to be registered with the AD service 302.

The local application 270 generates an auto-discovery (AD) packet for a remote device to determine if the remote device includes an application registered with or executing an AD service 302. The AD service 302 receives 506 the AD packet from the local application 270. More specifically, the local application 270 transmits a TCP packet with the SYN bit set to one or more remote devices within network 300. The AD packet is received 506 or intercepted by a traffic interceptor module 408 attached to the local VM $235_1$ and to the port 410 associated with the local VM $235_1$. The traffic interceptor module 408 determines 508 if the information in the AD packet header satisfies the traffic interception rules. In an embodiment, if the SYN bit is set within the AD packet header and the source IP address, the destination IP address, and the destination port number match the database fields, and if the AD packet represents a new network connection (i.e., the network connection to the remote device is not present within the database), the traffic interception rules are satisfied.

In an embodiment, if the traffic interception rules are not satisfied, traffic interceptor module 408 ignores 510 (i.e., does not modify) the packet and transmits the packet to virtual switch 412 for transmission to the destination remote device. However, if the traffic interception rules are satisfied, traffic interceptor module 408 inserts 512 a TCP option into an option field of the AD packet. The option includes the message provided by the local application 270. In one embodiment, traffic interceptor module 408 sets the option type of the option to 0x14, or to another unused option type, and transmits 514 the AD packet to the remote device (and to the remote application) using the virtual switch 412.

If the remote device includes an application registered with or executing AD service 302, a traffic interceptor module 408 executing on the remote device (i.e., a remote traffic interceptor module 408) receives or intercepts the AD packet. The AD packet is analyzed by a remote traffic interceptor module 408 to determine if the remote traffic interception rules are satisfied. If the remote traffic interception rules are satisfied, the remote traffic interceptor module 408 extracts the message from the AD packet (e.g., the IP address of the local application 270) and stores or registers the local application 270 and its message in the remote AD service 302 in a similar manner as described herein with respect to the local AD service 302. The remote traffic interceptor module 408 also inserts a message, such as an IP address, provided by the remote application registered with the remote AD service 302, into a TCP packet with both the SYN bit and the ACK bits set (hereinafter referred to as an "AD response packet"). The message is included within the AD response packet as a TCP option with the option type set to the predetermined option type (e.g., 0x14). The AD response packet is transmitted back to the local application 270 and is received 516 by the virtual switch 412 and by the traffic interceptor module 408 associated with the local application 270.

The local traffic interceptor module 408 determines 518 if the AD response packet header information satisfies the traffic interception rules. In an embodiment, if the SYN bit and the ACK bit are set within an inbound packet (e.g., the AD response packet) header, and if the source IP address, the destination IP address, and the destination port number match the database fields, the traffic interception rules are satisfied. If the packet header information does not satisfy the traffic interception rules, the packet is ignored 520 (i.e., passed along to the packet destination without modifying the packet) by the traffic interceptor module 408, and the traffic interceptor module 408 continues receiving 516 packets.

If the AD response packet satisfies the traffic interception rules, the traffic interceptor module 408 extracts 522 the message provided by the remote application and AD service 302 from the packet. More specifically, the traffic interceptor module 408 extracts the data stored in the option field of the packet corresponding to the option type (e.g., 0x14) and sets or identifies the data to be the message. In an embodiment, the message is the IP address of the remote application. Traffic interceptor module 408 transmits the message to the local application 270 using the callback function of the local application 270. In an embodiment, the traffic interceptor module 408 calls 524 the callback function with the extracted message as a parameter passed into the callback function. The local application 270 stores the IP address of the remote application in database and/or within another memory location for use in communicating with the remote application.

After completion of method 500, local application 270 is aware of the remote application and the IP address of the remote application, and the remote application is aware of the local application 270 and the IP address of the local application 270. Accordingly, method 500 facilitates discovering network information of applications remote from a local application 270. While method 500 has been described with respect to discovering the existence and IP address of remote applications, it should be recognized that method 500 can be used to discover any other information of remote applications.

Exemplary Operating Environment

The auto-discovery service as described herein may be performed by a computer or computing device. A computer or computing device may include one or more processors or processing units, system memory, and some form of computer-readable media. Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media store information such as computer-readable instructions, data structures, program modules, or other data. Communication media typically embody computer-readable instructions, data structures, program modules, or other data in a modulated data signal such as a carrier wave or other transport mechanism and include any information delivery media. Combinations of any of the above are also included within the scope of computer-readable media.

Although described in connection with an exemplary computing system environment, embodiments of the disclosure are operative with numerous other general purpose or special purpose computing system environments or configurations. Examples of well known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The operations illustrated and described herein may be implemented as software instructions encoded on a computer-readable medium, in hardware programmed or designed to perform the operations, or both. For example, aspects of the disclosure may be implemented as a system on a chip.

The embodiments illustrated and described herein as well as embodiments not specifically described herein but within the scope of aspects of the disclosure constitute exemplary means for maintaining high availability of software application instances, such as virtual machines.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
 a first host computing device comprising a first virtual machine (VM) and a first application executing on the first VM; and a second host computing device communicatively coupled to the first host computing device to form a network, the second host computing device comprising:
  a virtualization software layer;
  a database;
  a second VM, wherein a second application is executing within the second VM;
  an auto-discovery service at least partially instantiated within the virtualization software layer and communicatively coupled to the second VM; and
  a traffic interceptor module within the auto-discovery service, wherein the auto-discovery service is configured to:
    register the second application with the auto-discovery service, wherein registering the second application includes receiving a message from the second application;
    intercept, using the traffic interceptor module, a packet from the second application that is bound for the first host computing device;
    determine whether the packet satisfies a first condition, the first condition being that the packet represents a new network connection for the second application;
    receive, from the second application, one or more of a plurality of second conditions, the one or more of the plurality of second conditions being that the packet includes fields matching one or more of the following: a source IP address, a destination IP address, and a destination port number stored in the database;
    register the one or more of the plurality of second conditions with the traffic interceptor module;
    determine whether the packet satisfies the one or more of the plurality of second conditions;
    when the packet satisfies the first condition and the one or more of the plurality of second conditions, insert an option into the packet, wherein the option includes the message received from the second application and transmit the packet to the first host computing device to discover applications within the first host computing device;
    in response to the packet transmitted to the first host computing device, receive, from the first host computing device, a second packet comprising a second message that includes an internet protocol (IP) address of the first application;
    extract the second message from the second packet;
    determining whether the second packet satisfies the one or more of the plurality of second conditions; and
    based on the second packet satisfying the one or more of the plurality of second conditions, transmit the extracted second message to the second application.

2. The system of claim 1, wherein the database stores:
a list of network connections for the second application, the database fields comprising the source IP address; and
the destination IP address, and the destination port.

3. The system of claim 1, wherein the first condition further comprises whether a transmission control protocol (TCP) SYN bit is set within a header of the packet.

4. The system of claim 1, wherein the traffic interceptor module is configured to receive network packets transmitted to the second VM and to receive network packets transmitted from the second VM.

5. The system of claim 4, wherein the virtualization software layer comprises a virtual switch comprising a plurality of ports for connecting to a plurality of VMs, and wherein the traffic interceptor module is connected to a port associated with the second VM.

6. The system of claim 4, wherein the auto-discovery service is further configured to register at least one traffic interception rule with the traffic interceptor module.

7. The system of claim 1, wherein the message is encoded by the second application and wherein the message comprises an IP address of the second application.

8. The system of claim 7, wherein the message is encoded as a transmission control protocol (TCP) option, and wherein contents of the message contents are included in the TCP option field.

9. A method of discovering network applications, the method comprising:
  instantiate a traffic interceptor module within an auto-discovery service executing within a virtualization software layer of a first computing device;
  register the first application with the auto-discovery service, wherein registering the first application includes receiving, by the auto-discovery, a message from the first application executing on a first VM of the first computing device;
  intercepting, by the traffic interceptor module, a packet from the first application that is bound for a second computing device;
  determining, by the auto-discovery service, whether the packet satisfies a first condition, the first condition being that the packet represents a new network connection for the second application;
  receiving, by the auto-discovery service, one or more of a plurality of second conditions, the one or more of the plurality of second conditions being that the packet includes fields matching one or more of the following: a source IP address, a destination IP address, and a destination port number stored in a database;
  register the one or more of the plurality of second conditions with the traffic interceptor module;
  determine whether the packet satisfies the first condition and the one or more of the plurality of second conditions;
  when the packet satisfies the first condition and the one or more of the plurality of second conditions, insert, by the auto-discovery service, an option into the packet, wherein the option includes the message received from the first application and transmitting, by the auto-discovery service, the packet to the second computing device to discover applications within the second computing device;
  in response to the packet transmitted to the second computing device, receiving, from the second computing device, a second packet comprising a second message that includes an internet protocol (IP) address of a second application that exists within the second computing device;
  extracting the second message from the second packet;
  determining whether the second packet satisfies the one or more of the plurality of second conditions; and
  based on the second packet satisfying the one or more of the plurality of second conditions, transmitting the extracted second message to the first application.

10. The method of claim 9, wherein the one or more of the plurality of second conditions are being that the packet includes fields matching the source IP address, the destination IP address, and the destination port number stored in a database.

11. The method of claim 10, further comprising calling the callback function with the extracted message.

12. A non-transitory computer-readable storage medium having computer executable instructions embodied thereon, wherein, when executed by a processor, the computer-executable instructions cause the processor to:
  instantiate a traffic interceptor module within an auto-discovery service executing within a virtualization software layer of a first computing device;
  attach the traffic interceptor module to a virtual switch within the virtualization software layer;
  attach the traffic interceptor module to a first VM, wherein a first application is executing within the first VM;
  register the first application with the auto-discovery service, wherein registering the first application includes receiving a message from the first application;
  intercept, by the traffic interceptor module, a packet from the first application that is bound for a second computing device;
  receive, from the first application, one or more of a plurality of first conditions;
  register the one or more of the plurality of first conditions with the traffic interceptor module;
  determine whether the packet satisfies a second condition, the second condition being the packet represents a new network connection for the first application, and whether the packet satisfies the one or more of the plurality of first conditions being that the packet includes fields matching one or more of the following: a source IP address, a destination IP address, and a destination port number stored in a database;
  when the packet satisfies the one or more of the plurality of first conditions and the second condition, insert the message into the packet and transmit the packet to the second computing device to discover applications within the second computing device;
  in response to the packet transmitted to the second computing device, receive, by the auto-discovery service from the second computing device, a second message within a second packet that includes internet protocol (IP) address of a second application that exists within the second computing device;
  extract the second message from the second packet;
  determine whether the second packet satisfies the one or more of the plurality of first conditions; and
  based on the second packet satisfying the one or more of the plurality of first conditions, transmit the extracted second message to the first application.

13. The non-transitory computer-readable storage medium of claim 12, wherein the computer executable instructions further cause the processor to register the second condition with the traffic interceptor module.

14. The non-transitory computer-readable storage medium of claim 13, wherein the computer executable instructions further cause the processor to register a callback function of the first application with the auto-discovery service.

15. The non-transitory computer-readable storage medium of claim 14, wherein the computer executable instructions further cause the processor to determine whether the second packet received from the second application satisfies the second condition.

16. The non-transitory computer-readable storage medium of claim 15, wherein the computer executable instructions further cause the processor to call the callback function if the second packet received from the second application satisfies the one or more of the plurality of first conditions.

17. The non-transitory computer-readable storage medium of claim 16, wherein the second condition further comprises whether a transmission control protocol (TCP) SYN bit is set within a header of the packet.

18. The method of claim 9, wherein the packet is a SYN packet and the second packet is a SYN-ACK packet.

19. The method of claim 18, wherein the second condition further comprises whether a SYN bit and an ACK bit are set within the packet.

* * * * *